(12) United States Patent
Hildreth

(10) Patent No.: US 8,144,118 B2
(45) Date of Patent: Mar. 27, 2012

(54) MOTION-BASED TRACKING

(75) Inventor: Evan Hildreth, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 1387 days.

(21) Appl. No.: 11/337,090

(22) Filed: Jan. 23, 2006

(65) Prior Publication Data

US 2006/0192782 A1 Aug. 31, 2006

Related U.S. Application Data

(60) Provisional application No. 60/645,074, filed on Jan. 21, 2005.

(51) Int. Cl.
*G09G 5/00* (2006.01)
*A63F 9/24* (2006.01)
*A63F 13/00* (2006.01)
*G06F 17/00* (2006.01)
*G06F 19/00* (2011.01)
*H04N 5/228* (2006.01)

(52) U.S. Cl. .......................... 345/156; 463/2; 348/222.1

(58) Field of Classification Search .................. 463/2, 3, 463/4, 5
See application file for complete search history.

(56) References Cited

U.S. PATENT DOCUMENTS

| 4,746,770 | A | | 5/1988 | McAvinney |
|---|---|---|---|---|
| 5,164,992 | A | | 11/1992 | Turk et al. |
| 5,435,554 | A | | 7/1995 | Lipson |
| 5,436,639 | A | * | 7/1995 | Arai et al. ..................... 345/156 |
| 5,483,261 | A | | 1/1996 | Yasutake |
| 5,528,263 | A | * | 6/1996 | Platzker et al. ............... 345/156 |
| 5,534,917 | A | | 7/1996 | MacDougall |
| 5,710,833 | A | | 1/1998 | Moghaddam et al. |
| 5,808,678 | A | | 9/1998 | Sakaegi |
| 5,818,421 | A | | 10/1998 | Ogino et al. |
| 5,852,672 | A | | 12/1998 | Lu |
| 5,982,352 | A | | 11/1999 | Pryor |
| 5,986,675 | A | | 11/1999 | Anderson et al. |

(Continued)

FOREIGN PATENT DOCUMENTS

WO WO03036557 A1 5/2003

OTHER PUBLICATIONS

International Search Report, Application Serial No. PCT/US06/00345, dated Oct. 24, 2007, 11 pages.

(Continued)

*Primary Examiner* — Albert Cutler
(74) *Attorney, Agent, or Firm* — Kilpatrick Townsend & Stockton LLP

(57) ABSTRACT

In one implementation, a first captured image is accessed. The first captured image includes (1) a first display produced at a first point in time, and (2) a user interacting with the first display and not part of the first display. A second captured image is accessed. The second captured image includes (1) a second display produced at a second point in time, and (2) the user interacting with the second display and not part of the second display. The first captured image and the second captured image are compared. The motion of the user is determined based on a result of the comparing of the first captured image and the second captured image. The determined motion of the user is related to a portion of one or more of the first and second captured images.

20 Claims, 11 Drawing Sheets

U.S. PATENT DOCUMENTS

| | | | |
|---|---|---|---|
| 6,008,800 A | 12/1999 | Pryor | |
| 6,072,496 A | 6/2000 | Guenter et al. | |
| 6,075,905 A | 6/2000 | Herman et al. | |
| 6,100,538 A | 8/2000 | Ogawa | |
| 6,191,773 B1 * | 2/2001 | Maruno et al. | 345/158 |
| 6,195,104 B1 * | 2/2001 | Lyons | 345/473 |
| 6,201,554 B1 | 3/2001 | Lands | |
| 6,215,890 B1 | 4/2001 | Matsuo et al. | |
| 6,275,214 B1 | 8/2001 | Hansen | |
| 6,377,700 B1 | 4/2002 | Mack et al. | |
| 6,414,672 B2 * | 7/2002 | Rekimoto et al. | 345/173 |
| 6,535,114 B1 | 3/2003 | Suzuki et al. | |
| 6,624,833 B1 | 9/2003 | Kumar | |
| 6,628,819 B1 | 9/2003 | Huang et al. | |
| 6,640,145 B2 | 10/2003 | Hoffberg et al. | |
| 6,683,677 B2 * | 1/2004 | Chon et al. | 356/28 |
| RE38,420 E | 2/2004 | Thomas | |
| 6,720,949 B1 | 4/2004 | Pryor et al. | |
| 6,760,009 B2 | 7/2004 | Omura et al. | |
| 6,762,747 B2 | 7/2004 | Fujioka et al. | |
| 6,791,531 B1 | 9/2004 | Johnston et al. | |
| 6,803,906 B1 | 10/2004 | Morrison et al. | |
| 7,015,950 B1 | 3/2006 | Pryor | |
| 7,170,492 B2 | 1/2007 | Bell | |
| 7,187,412 B1 | 3/2007 | Silverstein | |
| 7,379,566 B2 | 5/2008 | Hildreth | |
| 2001/0013950 A1 | 8/2001 | Pornbacher | |
| 2001/0046309 A1 | 11/2001 | Kamei | |
| 2002/0084974 A1 * | 7/2002 | Ohshima et al. | 345/156 |
| 2002/0153188 A1 | 10/2002 | Brandt et al. | |
| 2002/0158815 A1 | 10/2002 | Zwern | |
| 2002/0186221 A1 | 12/2002 | Bell | |
| 2003/0098841 A1 | 5/2003 | Broussard | |
| 2004/0005924 A1 * | 1/2004 | Watabe et al. | 463/36 |
| 2004/0102247 A1 * | 5/2004 | Smoot et al. | 463/36 |
| 2004/0174431 A1 * | 9/2004 | Stienstra | 348/155 |
| 2004/0179728 A1 | 9/2004 | Littlefield et al. | |
| 2004/0183775 A1 * | 9/2004 | Bell | 345/156 |
| 2004/0189720 A1 * | 9/2004 | Wilson et al. | 345/863 |
| 2004/0193413 A1 | 9/2004 | Wilson et al. | |
| 2004/0228519 A1 | 11/2004 | Littlefield et al. | |
| 2004/0246333 A1 | 12/2004 | Steuart, III | |
| 2004/0257452 A1 | 12/2004 | Chang et al. | |
| 2005/0075975 A1 | 4/2005 | Rosner et al. | |
| 2005/0088407 A1 | 4/2005 | Bell et al. | |
| 2005/0088409 A1 * | 4/2005 | Van Berkel | 345/157 |
| 2005/0089194 A1 | 4/2005 | Bell | |
| 2005/0110875 A1 | 5/2005 | Ma et al. | |
| 2005/0110964 A1 | 5/2005 | Bell et al. | |
| 2005/0116931 A1 * | 6/2005 | Olbrich | 345/158 |
| 2005/0122308 A1 | 6/2005 | Bell et al. | |
| 2005/0150122 A1 | 7/2005 | Cho et al. | |
| 2005/0162381 A1 | 7/2005 | Bell et al. | |
| 2006/0007124 A1 * | 1/2006 | Dehlin | 345/156 |
| 2006/0044289 A1 * | 3/2006 | Yee | 345/204 |
| 2006/0103854 A1 | 5/2006 | Franke et al. | |
| 2006/0132432 A1 | 6/2006 | Bell | |
| 2006/0139314 A1 | 6/2006 | Bell | |
| 2006/0221072 A1 | 10/2006 | Se et al. | |
| 2007/0085849 A1 | 4/2007 | Kosolapov | |
| 2007/0131850 A1 | 6/2007 | Cofer et al. | |
| 2007/0165246 A1 | 7/2007 | Kimmel | |

OTHER PUBLICATIONS

Notification of Transmittal of the International Search Report and the Written Opinion of the International Searching Authority, or the Declaration, dated Feb. 13, 2007 (10 pages).

Notification of Transmittal of the International Search Report and the Written Opinion of the International Searching Authority, or the Declaration dated Mar. 27, 2007 (15 pages).

Office Action, U.S. Appl. No. 11/326,610, dated Feb. 16, 2007, 26 pages.

Office Action, U.S. Appl. No. 11/326,610, dated Jul. 23, 2007, 30 pages.

Office Action, U.S. Appl. No. 11/327,651, dated Sep. 5, 2007, 18 pages.

Galvin, B., et al., "Recovering Motion Fields: An Evaluation of Eight Optical Flow Algorithms", British Machine Vision Conference (1998), pp. 195-204.

Horn, Berthold K. P., et al., "Determining Optical Flow", Artificial Intelligence 17 (1981), pp. 185-203.

Lucas, Bruce D., et al, "An Iterative Image Registration Technique with an Application to Stereo Vision", From Proceedings of Imaging Understanding Workshop, (1981), pp. 121-129.

May, Richard Allen, "Toward Directly Mediated Interaction in Computer Supported Environments", Ph.D. Thesis, University of Washington (2004), pp. 1-182.

SIGGRAPH, http://www.siggraph.org/~fujii/etech/2000_281.html, Emerging Technologies 1991-2002, Mar. 24, 2006, 2 pages.

Wellner, Pierre, "Interacting with Paper on the Digital Desk", Communications of the ACM, vol. 36, No. 7, (Jul. 1993), pp. 87-96.

Notice of Allowance issued in U.S. Appl. No. 12/145,194, mailed Jun. 15, 2010, 14 pages.

Non-Final Office Action issued in U.S. Appl. No. 11/932,819, mailed Mar. 31, 2010, 28 pages.

Notice of Allowance issued in U.S. Appl. No. 11/932,819, mailed Aug. 2, 2010, 15 pages.

Notice of Allowance issued in U.S. Appl. No. 11/757,180 mailed Jul. 2, 2010, 15 pages.

Pinhanez, C., 'The Everywhere Displays Projector: A Device to Create Ubiquitous Graphical Interfaces,' Ubcomp 2001, LNCS2201, G.D. Abowd, B. Brumitt, S.A.N. Shafer, eds., pp. 315-331, Springer-Verlag Berlin Heidelberg, 2001.

Kjeldsen, R., et al., 'Interacting with Steerable Projected Displays,' Proceedings of the Fifth IEEE International Conference on Automatic Face and Gesture Recognition (FGR'02), May 20, 2002, pp. 402-407.

European Search Report for European Application No. 06719160.1, mailed Jan. 27, 2011, 7 pages.

* cited by examiner

US 8,144,118 B2

MOTION-BASED TRACKING

CROSS-REFERENCE TO RELATED APPLICATION

The present application claims priority from U.S. Provisional Application No. 60/645,074 filed Jan. 21, 2005, and titled "Motion-Based Tracking of a User in Front of a Projected Background," the entire contents of which are incorporated herein by reference for all purposes.

TECHNICAL FIELD

This disclosure relates in part to image processing, and more particularly to detecting motion in images.

BACKGROUND

Various systems project or display information that a user is expected to interact with, at least indirectly. For example, computers often display a document on a monitor, and the user is expected to interact indirectly with the displayed document by using a mouse to position the cursor within the displayed document. Such computers may also project the document onto a projection screen using a projector, rather than displaying the document on a monitor. As another example, touch screen computers allow a user to interact more directly with a displayed image by touching the monitor at positions indicated by the image itself, such as, for example, touching a particular element in a displayed image in order to select that element.

SUMMARY

One disclosed implementation allows a user to interact directly with displayed or projected images by detecting a user's motion, and generating an input based on the user's motion. For example, an image may be generated by a video game and displayed, and a user may point to an icon in the image with the intention of selecting that icon. A disclosed system detects the user's motion, associates the detected motion with the selection of the icon, and provides the application with an input that indicates that the icon was selected by the user. The system detects the user's motion using a camera.

According to one general aspect, a first captured image is accessed. The first captured image includes (1) a first display produced at a first point in time, and (2) a user interacting with the first display and not part of the first display. A second captured image is accessed. The second captured image includes (1) a second display produced at a second point in time, and (2) the user interacting with the second display and not part of the second display. The first captured image and the second captured image are compared. The motion of the user is determined based on a result of the comparing of the first captured image and the second captured image. The determined motion of the user is related to a portion of one or more of the first and second captured images.

Implementations of the above general aspect may include one or more of the following features. For example, an indication of the determined motion of the user and the portion may be provided to the computing device. Additionally or alternatively, an input for the set of instructions may be determined based on the determined motion and the portion.

Comparing the first and second captured images may include performing an absolute difference operation or an optical flow operation on the first captured image and the second captured image. Comparing the first and second captured images may include producing the result, and the result may be an image indicating motion of the user and motion associated with one or more objects in the first and second displays. A geometric transform operation may be performed on the result.

Determining motion of the user, based on the result of the comparing of the first captured image and the second captured image, may include isolating, in the result, the motion of the user from the motion associated with one or more objects in the first and second displays.

An image indicating the motion associated with one or more objects in the first and second displays may be accessed. Isolating, in the result, the motion of the user from the motion associated with one or more objects in the first and second displays may include comparing the result and the image indicating the motion associated with one or more objects in the first and second displays.

Accessing the image indicating motion associated with one or more objects in the first and second displays may include accessing a first display image that corresponds to the first display, accessing a second display image that corresponds to the second display, and generating the image indicating motion associated with one or more objects in the first and second displays. The image indicating motion associated with one or more objects in the first and second displays may be generated by performing an absolute difference operation on the first display image and the second display image. Alternatively, the image indicating motion associated with one or more objects in the first and second displays may be generated by performing an optical flow operation on the first display image and the second display image.

A latency compensation operation may be performed on the image indicating motion associated with one or more objects in the first and second displays.

According to another general aspect, a system includes a captured image motion detection module and a comparison module. The captured image motion detection module is configured to access a first captured image that includes (1) a first display produced at a first point in time by a set of instructions executed by a computing device, and (2) a user interacting with the first display and not part of the first display. The captured image motion detection module is also configured to access a second captured image that includes (1) a second display produced at a second point in time by the set of instructions executed by the computing device, and (2) the user interacting with the second display and not part of the second display. The captured image motion detection module is further configured to generate an image representing motion between the first and second captured images by comparing the first captured image and the second captured image. The comparison module is configured to generate an image representing motion of the user, based on a result of comparing an image representing motion associated with one or more objects in the first and second displays and the image representing motion between the first and second captured images.

Implementations of the above general aspect may include one or more of the following features. For example, the system may include a display image motion detection module configured to access the first display image, access the second display image, and generate the image representing motion associated with one or more objects in the first and second displays by comparing the first display image to the second display image.

The system may also include a camera configured (1) to capture the first captured image and provide the first captured image to the captured image motion detection module, and (2) to capture the second captured image and provide the second captured image to the captured image motion detection module. Additionally or alternatively, the system may include a display to display images and a computing device configured to execute a set of instructions to produce the first and second display images.

The system may include a latency compensation module configured to perform a latency compensation operation on the image representing motion associated with one or more objects in the first and second displays. The system may also include a geometric transform module configured to perform a geometric transform operation on the image representing motion between the first and second captured images.

The various aspects, implementations, and features may be implemented in one or more of a variety of manners, even if described above using only one manner. For example, the various aspects, implementations, and features may be implemented using, for example, one or more of a method, an apparatus, an apparatus or tool or processing device for performing a method, a program or other set of instructions, an apparatus that includes a program or a set of instructions, and a computer readable medium. The computer readable medium may include, for example, instructions, software, images, and other data.

The details of one or more implementations are set forth in the accompanying drawings and the description below. Other features will be apparent from the description and drawings, and from the claims.

DETAILED DESCRIPTION

Figure 1A:
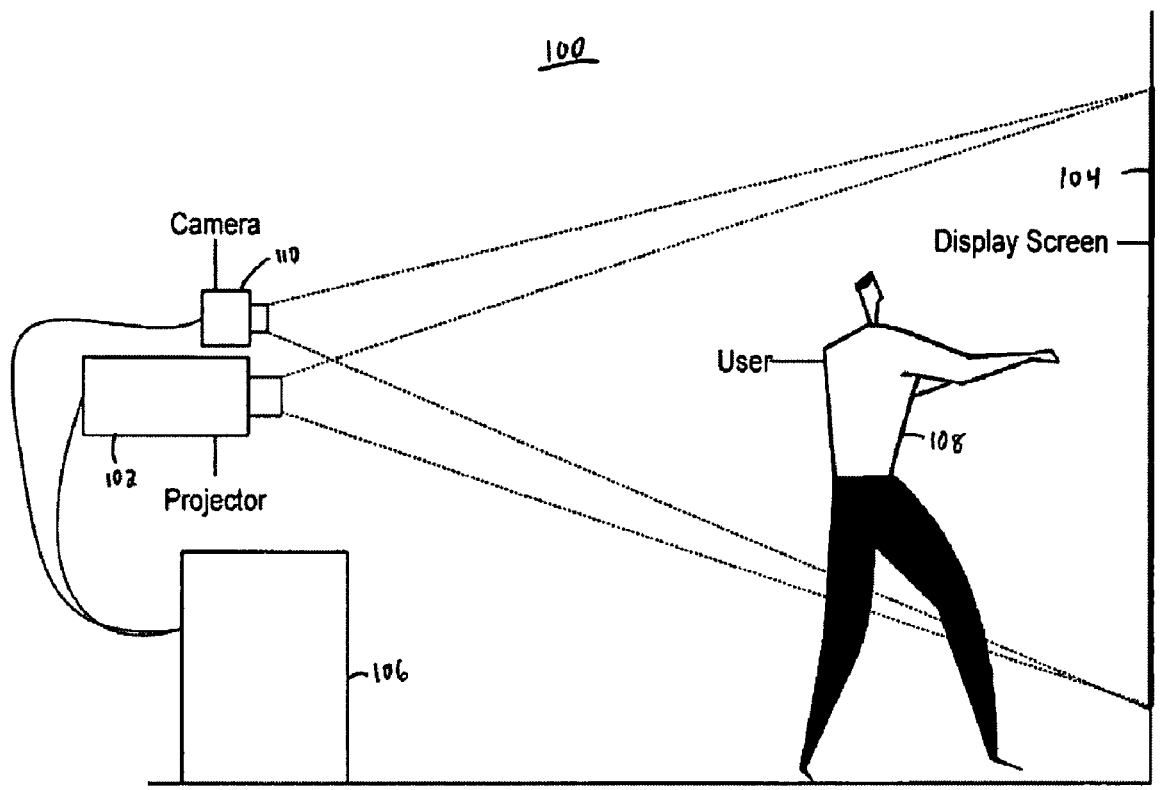
FIG. 1A illustrates a first interactive system.

In one particular implementation, a video game application generates images and a computer system projects the images for a user. The user plays the video game by moving in front of the projected images, and interacting with the projected images as if they were a virtual reality display. For example, a user may swing at a target that is included as an object in the projected image. In this example, the implementation detects the user's swing, determines that the user was swinging at the target, and provides the video game application an input indicating that the user swung at the target. The video game application then generates the appropriate image to project in response to receiving the input that the user swung at the target.

The implementation is able to detect the user's swing by using a camera to capture a sequence of images that includes the projected image and the user, as the user swings. The implementation also has access to a series of projected images without the user. The implementation determines the motion in each sequence of images, and compares the determined motion in the sequences to isolate (also referred to as "segment") the motion of the user. The implementation uses its knowledge of the location of the target to determine that the user's motion is indeed an attempted swing at the target, and provides this determination as an input to the video game application.

Changes in lighting conditions may degrade the quality of the display of projected images, because projected images must be sufficiently bright relative to ambient light levels in order to be perceived by a human or a camera. Otherwise, the apparent contrast of the projected images may be too low to enable perception. A camera may have a lower dynamic range than the human eye. Therefore, in order for a camera to capture an image including a projected image, the projected image may need to be brighter than it otherwise would have to be in order to be perceived by a human. For example, in order for a camera to capture an image including a projected image, the projected image may need to be brighter than the ambient light levels (e.g., sunlight or overhead lights), which may change (e.g., as the sun goes down during the course of a day). Projecting images as bright as or brighter than ambient light levels may be impractical and/or expensive.

However, changes in the local lighting conditions do not significantly impact or degrade the implementation's ability to detect the motion of the user. This is due, at least in part, to the fact that the implementation determines the motion of the user by isolating the motion of the user from the motion in the projected images. Local lighting conditions may degrade the quality of the display of the projected images and impair the ability of the camera to capture the projected images. However, changes in the local lighting conditions generally will not significantly impact the camera's ability to capture the motion of the user because the user reflects a sufficient amount of light. Thus, even if the sequence of captured images does not include the motion in the projected images, the sequence of captured images nevertheless includes the motion of the user.

In addition, in this implementation, the camera captures images at a sampling rate such that any changes in lighting conditions between successive frames are negligible. Changes in lighting conditions generally occur over the course of minutes or hours, while the sampling rate of the camera may be, for example, thirty images per second. Thus, this implementation typically captures similar lighting conditions in successive frames, and motion determinations between these frames generally will not confuse a change in lighting with motion. The fact that changes in local lighting conditions do not significantly impact or degrade the implementation's ability to detect the motion of the user allows the implementation to continue detecting the user's motion during periods when local lighting conditions are changing.

FIGS. 1A-1E illustrate examples of different interactive systems 100, 120, 130, 140, and 150. FIG. 1A illustrates a system 100 that includes a display device (e.g., a projector 102 and a display screen 104) that displays images (referred to as "display images") on a display screen 104. The camera 110 may capture images at a sampling rate of, for example, thirty images per second. The display images may be generated by an application residing on computing device 106 or the display images may be generated by an external application. The display images are said to be "displayed" in this discussion. It is clear, however, that the images are also projected. It should also be clear that other implementations need not project the images. For example, a liquid crystal display screen may be used.

A user 108 interacts with the display images on the display screen 104. A camera 110 captures images that include both the user 108 and the display images displayed on the display screen 104. Computing device 106 processes the images captured by the camera 110, isolates (i.e., segments) the motion of the user 108 from the motion in the display, and determines the motion of the user 108. The determined motion of the user 108 is used as input to the application that generates the display images.

The components of the interactive system 100 can be arranged in many different configurations, resulting in, for example, the different systems of FIGS. 1A-1E. Referring to FIG. 1A, the display screen 104 is located in front of user 108 while the projector 102 and the camera 110 are located behind the user 108. Thus, the user 108 is positioned between the projector 102 and the display screen 104. Consequently, the user 108 may block, or partially block, display images projected by the projector 102 on the display screen 104.

Figure 1B:
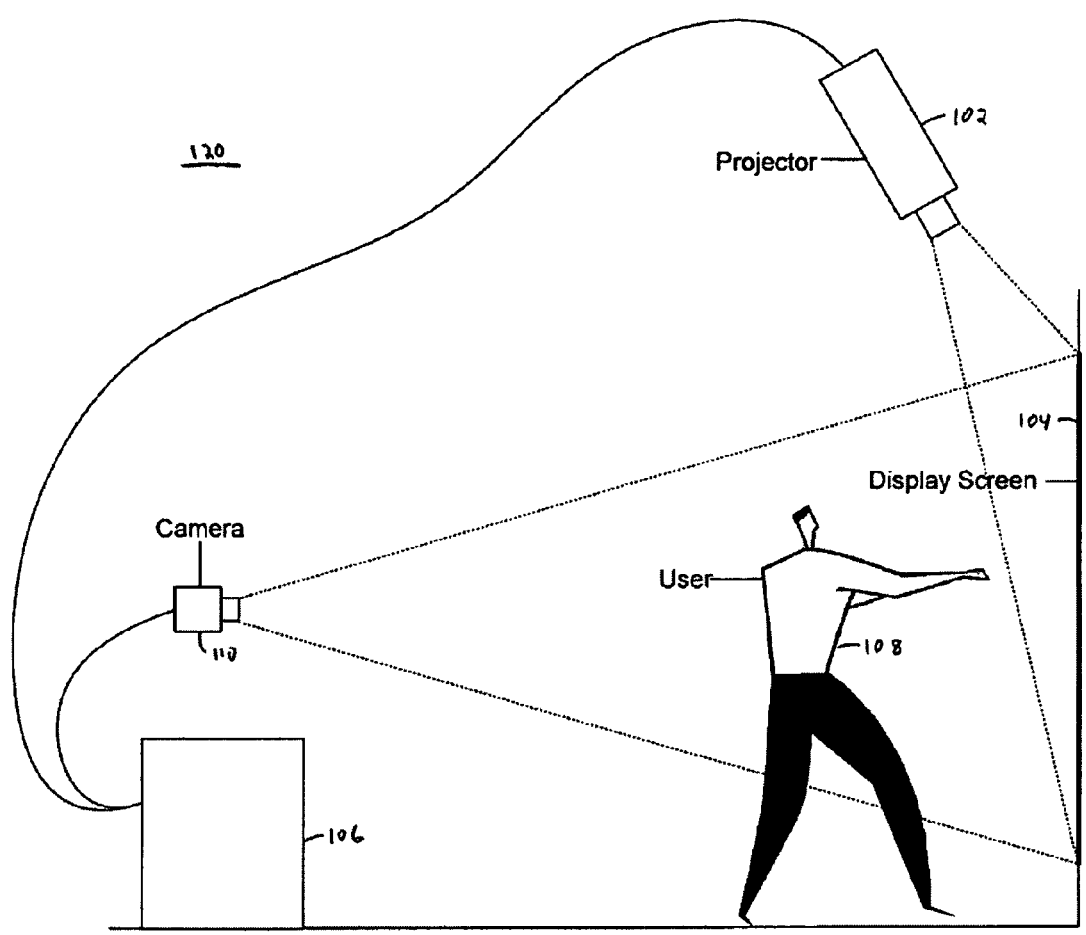
FIG. 1B illustrates a second interactive system.

Referring to FIG. 1B, a system 120 has the projector 102 located above the user 108, the display screen 104 is located in front of the user 108, and the camera 110 is located behind the user 108. This configuration may reduce or eliminate the portion of the display images that are blocked by the user 104.

Figure 1C:
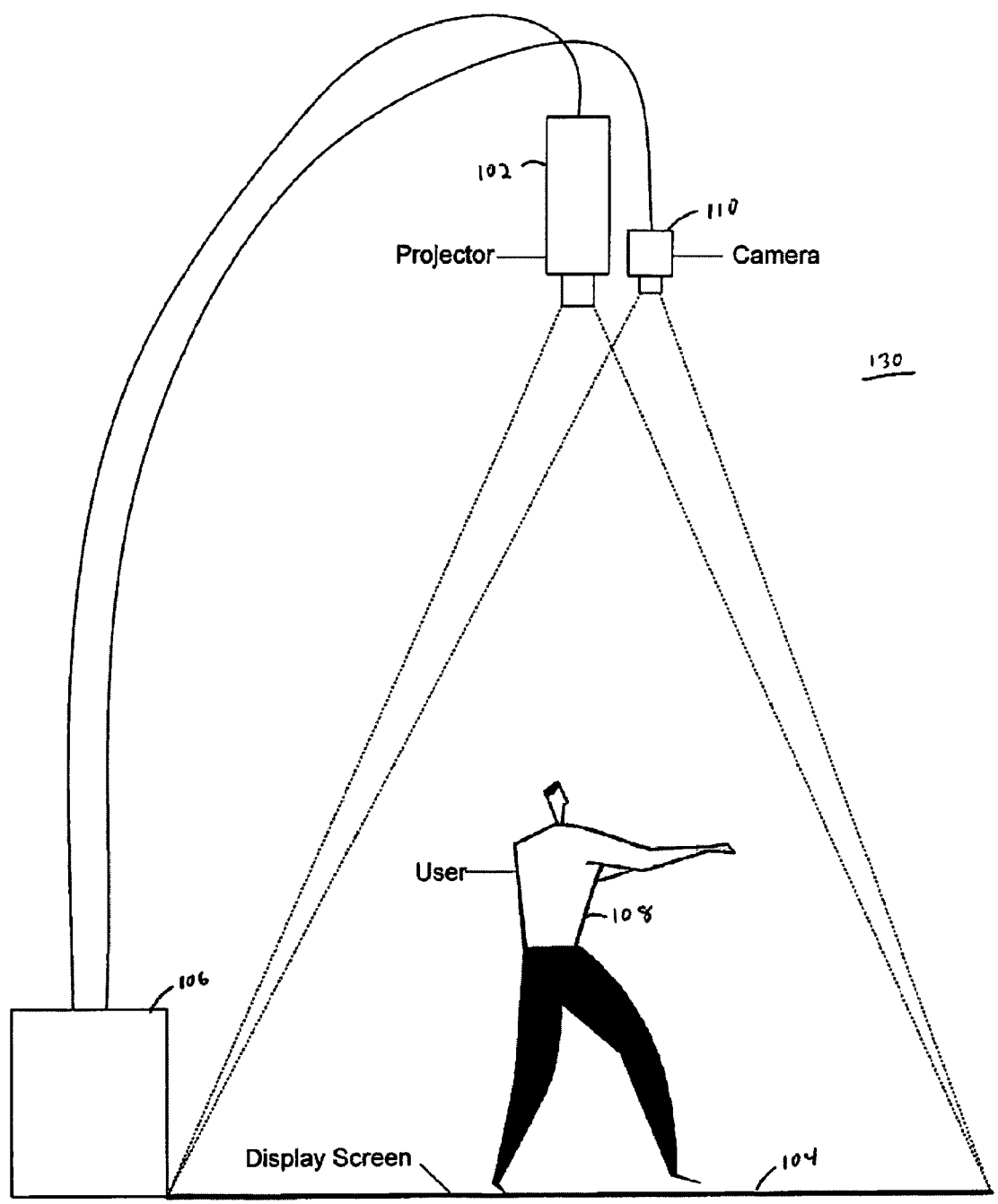
FIG. 1C illustrates a third interactive system.

Referring to FIG. 1C, a system 130 has the projector 102 and the camera 110 located above the user 108 while the display screen 104 is located below the user 108. As depicted in FIG. 1C, the display screen may be, for example, the floor.

Figure 1D:
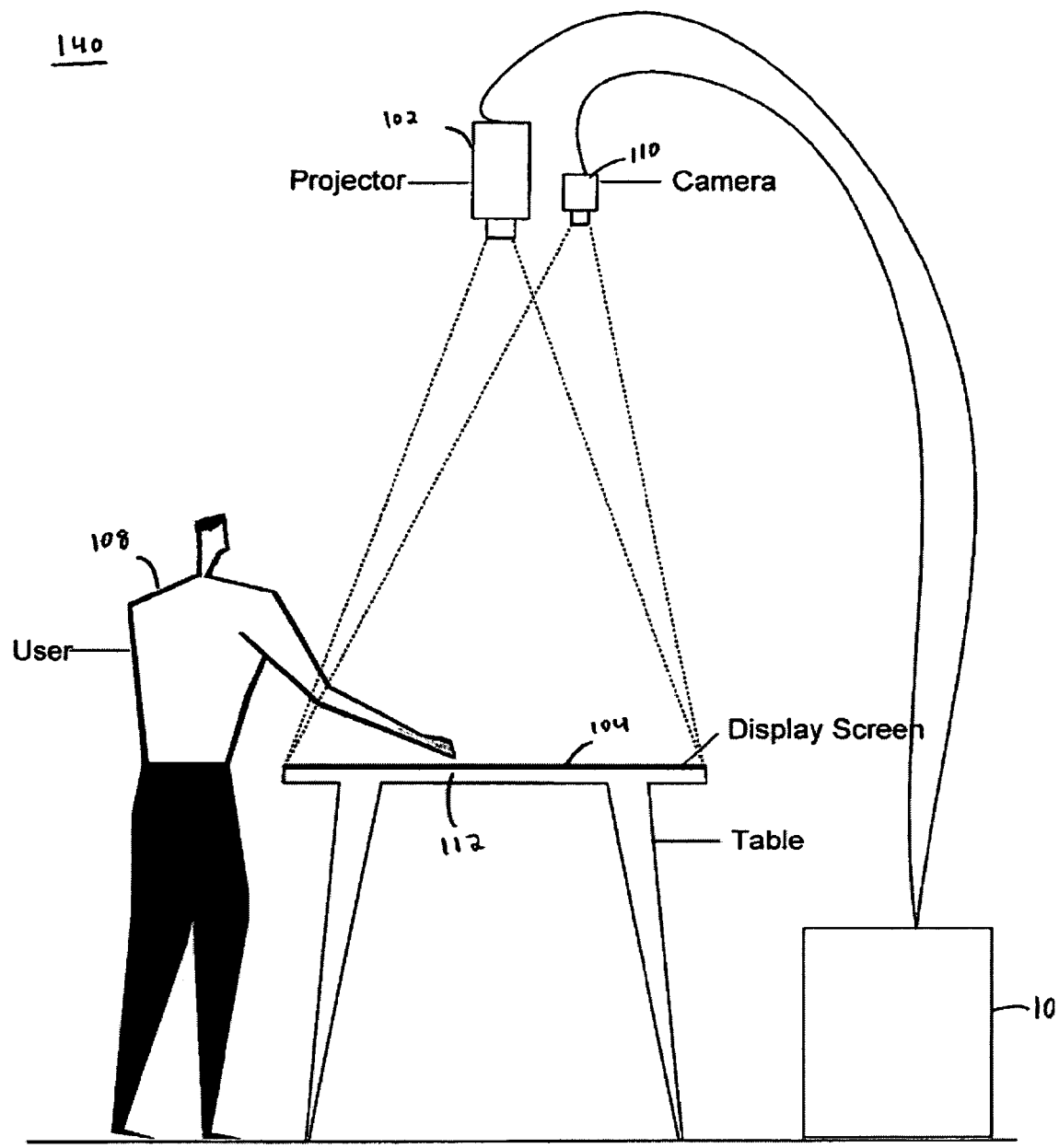
FIG. 1D illustrates a fourth interactive system.

Referring to FIG. 1D, a system 140 has the projector 102 and the camera 110 located above the user 108 and the display screen 104 is located on a tabletop 112. The user 108 may still block a limited, and typically minimized, portion of the display images.

Figure 1E:
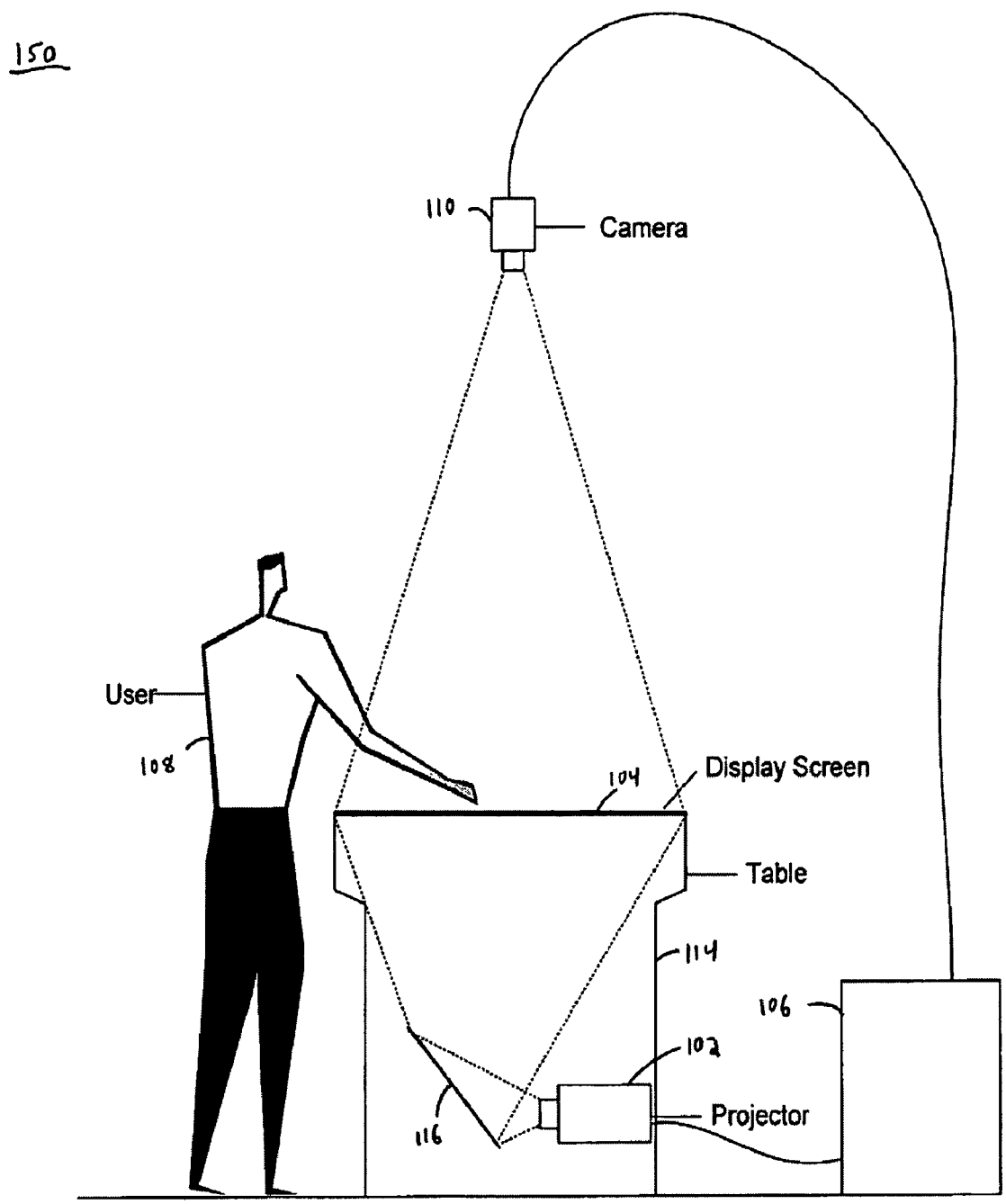
FIG. 1E illustrates a fifth interactive system.

Referring to FIG. 1E, a system 150 has the projector 102 located inside of a table 114. The projector 102 projects display images such that the display images are reflected by a reflecting device 116 (e.g., a mirror) and displayed on display screen 104. Display screen 104 is located on top of the table 114 and the camera 110 is located above the user 108. The user 108 does not block the display images. The computing device 106 optionally may be placed inside the table 114.

Other configurations are contemplated. Many variations are possible in which the camera is positioned so as to be able to capture images including at least a portion of both the display screen 104 and the user 108 interacting with the display images displayed on the display screen 104.

As depicted in FIGS. 1A-1E, the display device includes a projector 102 and a display screen 104. However, the display device could also include, for example, a plasma display, a liquid crystal display (LCD), a cathode ray-tube (CRT) display, or an auto-stereoscopic display.

Figure 2:
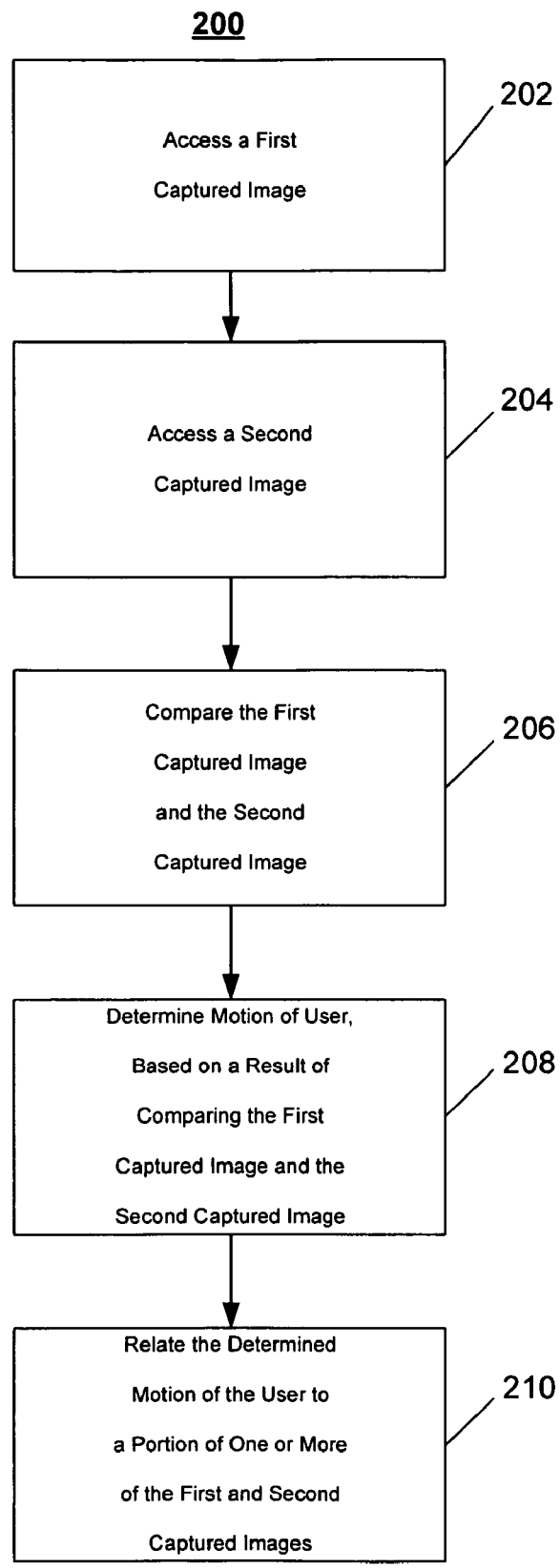
FIG. 2 is a flow chart of an example of a process for determining user motion and using the determined motion as input to an application.

Referring to FIG. 2, a process 200 may be used for determining the motion of the user 108 and for using the determined motion of the user 108 as input to an application. Process 200 may be implemented with a variety of systems, including system 100. For clarity of presentation, process 200 is described in the context of system 100, although other systems may be used. The use of system 100 in describing the implementation of process 200 is not intended to limit process 200.

Process 200 includes accessing a first captured image (202) and a second captured image (204). The camera 110 may be used to capture images of at least a portion of the display screen 104 and at least a portion of the user 108 interacting with the display screen 104. The captured images may be stored in and accessed from an image buffer.

The first captured image and the second captured image are then compared (206). Based on a result of comparing the first captured image and the second captured image, the motion of the user 108 is determined (208). The determined motion of the user is then related to a portion of one or more of the first and second captured images (210). The operations of an implementation of process 200 are more fully described in the description of FIG. 3 below.

Figure 3:
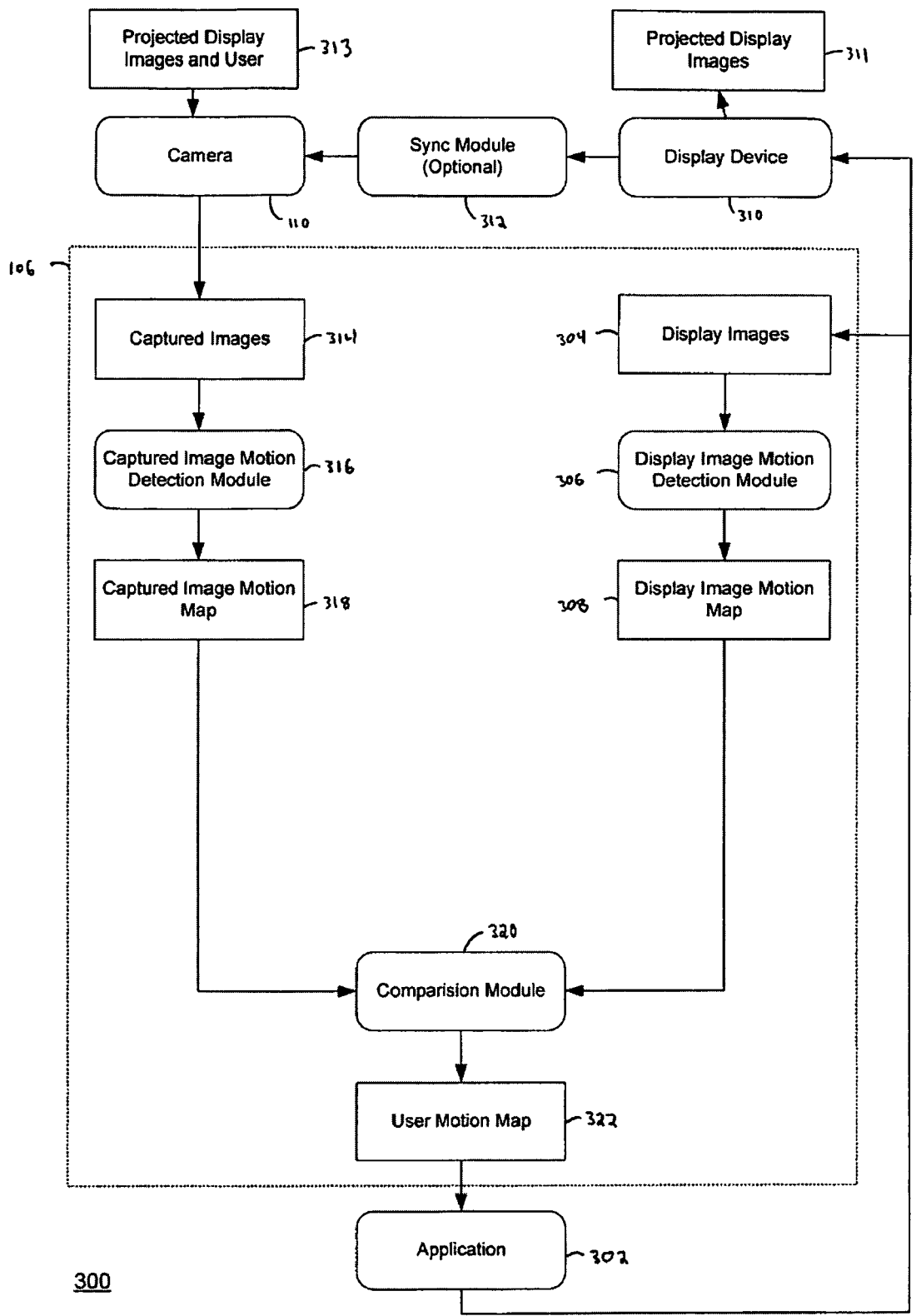
FIG. 3 is a block diagram of an architecture of an interactive system.

Referring to FIG. 3, an architecture 300 of a system is shown. For clarity of presentation, the architecture 300 is described in the context of system 100, although other systems may be used. The use of system 100 in describing the implementation of the architecture 300 is not intended to limit the architecture 300.

The architecture 300 includes an application 302 that generates display images 304 and provides the display images 304 to a display image motion detection module 306 of the computing device 106 and to a display device 310. The display images 304 may include animated objects. In other words, the position of objects in the display images 304 may change over time, thereby creating the effect of animation (e.g., motion). The difference between the positions of the objects in successive display images 304, for example, defines the motion in the display images 304. The display image motion detection module 306 compares display images 304 and produces a display image motion map 308 identifying motion in the display images 304, as more fully explained with respect to FIGS. 4A-4E.

Meanwhile, the display device 310 displays (e.g., projects) the display images 304. The projected display images 311 are displayed on the display screen 104 (not shown) and the user 108 (not shown) interacts with the display images 304. In this implementation, the user 108 interacts with the display images 304 by moving. For example, the user 108 may reach out towards or touch objects in the display images 304.

The camera 110 captures images 313 that include both the projected display images 311 and the user 108. The camera 110 provides the captured images 314 to a captured image motion detection module 316 of the computing device 106. The camera 110 may provide the captured images 314 directly to the captured image motion detection module 316. Alternatively, the captured images 314 may be stored in an image buffer from which the captured image motion detection module 316 can access the captured images 314. The position of the user 108 in the captured images 314 changes over time. The difference between the positions of the user 108 in consecutive captured images 314, for example, defines the motion of the user 108. The captured image motion detection module 316 compares captured images 314 and produces a captured image motion map 318 identifying motion in the captured images 314, as more fully explained in connection with FIGS. 5A-5E. Due to the fact that the captured images 314 include both the user 108 and the display images 304, the motion identified in the captured image motion map 318 includes both the motion of the user 108 and the motion in the display images 304.

In some implementations, a synchronization module 312 may be used to synchronize the display of the display images 304 with the capturing of images by the camera 110. Some display devices 310 (e.g., display devices including digital light processing (DLP) projectors) may display the red, green, and blue components of the display images 304 sequentially. While a human eye may be unable to detect the sequential display of the red, green, and blue components of the display images 304, the camera 110 may capture variable portions of the red, green, and blue components. As a result, the red, green, and blue components of the display images 304 captured within consecutive captured images 314 may differ, leading the captured image motion detection module 316 to detect motion in the captured images 314 that is not attributable to motion in the display images 304 but rather is created by the display device 310. Therefore, the synchronization module 312 may be used to ensure that a consistent portion of the red, green, and blue components are captured by the camera 110 in each captured image 314.

In some implementations, the display image motion detection module 306 and the captured image motion detection module 316 perform a comparison operation, for example, an absolute difference operation, on two images in order to generate a motion map. For grayscale images, a motion map is determined by calculating the magnitude (e.g., absolute value) of the difference in value of each pixel in the two images. Alternatively, for color images, a motion map is determined by summing the magnitude of the difference in value of each color channel (e.g., red, green, blue) for each pixel in the two images. A motion map generated by performing an absolute difference operation on two images identifies the presence of motion within regions of the images. For example, motion in a region of a grayscale sequence of images will produce a large absolute difference which will appear as a bright spot in the motion map.

In other implementations, the display image motion detection module 306 and the captured image motion detection module 316 perform an optical flow operation on two images in order to generate a motion map. In general, optical flow algorithms recognize motion within images (e.g., objects that have changed positions within images) and construct vectors representing the velocity (e.g., direction/orientation and magnitude) of the motion recognized in the images. Thus, optical flow algorithms determine not only the presence of motion within images, but also the direction and magnitude of motion within images. Consequently a motion map generated by performing an optical flow operation on two images identifies the presence, orientation, and magnitude of motion in the images.

The motion detection modules 306 and 316 also may perform filtering operations. For example, filtering may be used for motion maps generated by performing the absolute difference operation on two images. In some implementations, the motion detection modules 306 and 316 use an averaging kernel filter to filter motion maps. An averaging kernel filter determines the value of an individual pixel in a motion map based on the values of the pixels surrounding the individual pixel. For example, if a 3×3 averaging kernel filter is used, the value of an individual pixel is assigned the sum or the average of the individual pixel and the 8 pixels adjacent to the individual pixel. Filtering a motion map with an averaging kernel filter smoothes the edges of regions of motion and also reduces noise (e.g., extraneous regions of motion) in the motion map.

Additionally or alternatively, the motion detection modules 306 and 316 may perform dilation and erosion filtering operations on the motion maps. Dilation and erosion filtering operations both also determine the value of an individual pixel based on the values of the pixels surrounding the individual pixel. In a dilation operation, a filtering window is passed over the individual pixel and a set of pixels surrounding the individual pixel and the value of the individual pixel is assigned the same value as the pixel having the largest value within the filtering window. In an erosion operation, a filtering window is passed over the individual pixel and a set of pixels surrounding the individual pixel and the value of the individual pixel is assigned the same value as the pixel having the smallest value within the filtering window.

The motion detection modules 306 and 316 also may perform classification operations on motion maps. For example, the motion detection modules 306 and 316 may perform a threshold operation on the motion maps. In a threshold operation, an individual pixel is assigned a value representing "true" if the pixel's value is greater than a predefined value, and "false" if the pixel's value is less than or equal to the predefined value. Pixels assigned a value of true may represent pixels classified as representing motion while pixels assigned a value of false may represent pixels classified as not representing motion. In contrast, pixels assigned a value of true may represent pixels classified as not representing motion while pixels assigned a value of false may represent pixels classified as representing motion.

A comparison module 320 determines the motion of the user 108 by comparing a particular display image motion map 308 with a corresponding captured image motion map 318. Motion that appears in both the display image motion map 308 and the captured image motion map 318 is attributed to motion in the display while motion that appears only in the captured image motion map 318 is attributed to motion of the user 108. Therefore, the comparison module 320 creates a user motion map 322, identifying motion attributable solely (or predominately) to the user 108, by comparing the display image motion map 308 with the captured image motion map 318 and isolating (i.e., segmenting) the motion of the user 108 from the motion in the display.

In implementations where the motion detection modules 306 and 316 perform absolute difference operations, pixels that represent motion in both the display image motion map 308 and the captured image motion map 318 are attributed to motion in the display. Accordingly, such pixels are not classified as representing motion in the user motion map 322. In contrast, pixels that represent motion only in the captured image motion map 318 are attributed to user 108 motion and, therefore, are assigned a value representing motion in the user motion map 322.

In implementations where the motion detection modules 306 and 316 perform optical flow operations, motion in the captured image motion map 318 that is significantly different than motion in the display image motion map 308 is attributed to user 108 motion and retained in the user motion map 322. Motion in the captured image motion map 318 may be considered significantly different than motion in the display image motion map 308, for example, (1) if the difference in magnitude exceeds a magnitude threshold; or (2) if the difference in orientation (e.g., direction) exceeds an orientation threshold. Thus, in such implementations, user 108 motion can be detected even within regions that also exhibit motion in the display.

Other mechanisms for isolating user 108 motion from motion in the display exist. For example, display images 304 can be subtracted from corresponding captured images 314 to generate user images. User motion maps can then be generated based on consecutive user images.

The determined motion of the user 108 (e.g., as represented in the user motion map 322) is used as input to the application 302. For example, the application 302 may receive the user motion map 322 and determine from the user motion map 322 that the user 108 was swinging at a target in the display images 304. In response to the determination that the user 108 swung at the target, the application 302 generates the appropriate display image 304 and provides the display image to the display image motion detection module 306 and the display device 310.

The images shown in FIGS. 4A-4E, 5A-5E, and 6A-6B can be used to describe the image processing techniques used to determine the motion of the user 108. Such image processing techniques may be performed by, for example, the architecture 300 depicted in FIG. 3. Therefore, for clarity of presentation, the images shown in FIGS. 4A-4E, 5A-5E, and 6A-6B are described in the context of the architecture 300 depicted in FIG. 3, although other architectures and systems may be used to perform the same image processing techniques. Reference to the architecture 300 depicted in FIG. 3 while discussing the images shown in FIGS. 4A-4E, 5A-5E, and 6A-6B is not intended to limit the architectures and systems used to perform the image processing techniques described in connection with the images shown in FIGS. 4A-4E, 5A-5E, and 6A-6B.

Figure 4A:
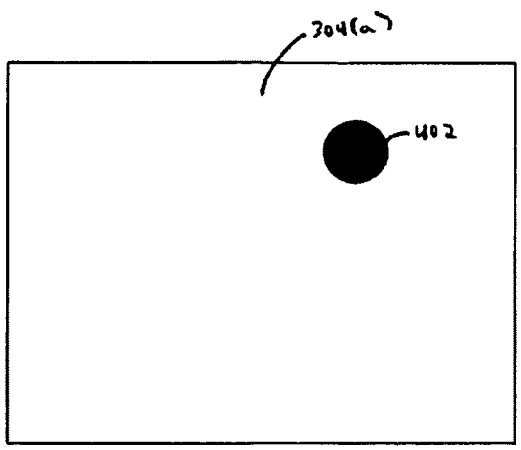
FIG. 4A illustrates a first display image.
Figure 4B:
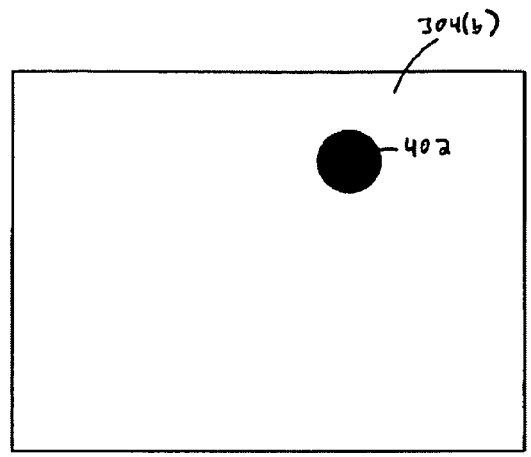
FIG. 4B illustrates a second display image.
Figure 4C:
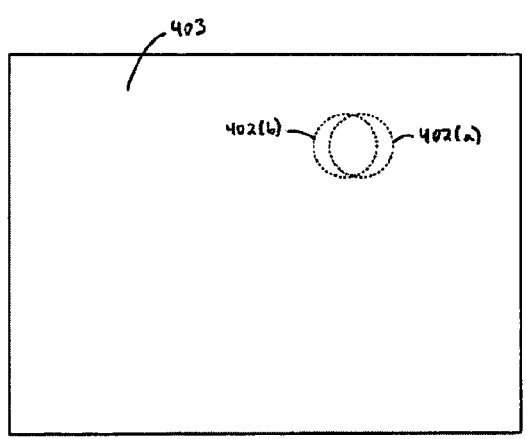
FIG. 4C illustrates a composite image of the first and second display images of FIGS. 4A-4B.

As a brief introduction to FIGS. 4A-4E, FIGS. 4A-4B show a sequence of display images. FIG. 4C shows a composite image of the sequence of the display images shown in FIGS. 4A-4B, and FIGS. 4D-4E show display motion maps identifying motion in the sequence of display images shown in FIGS. 4A-4B.

Figure 5A:
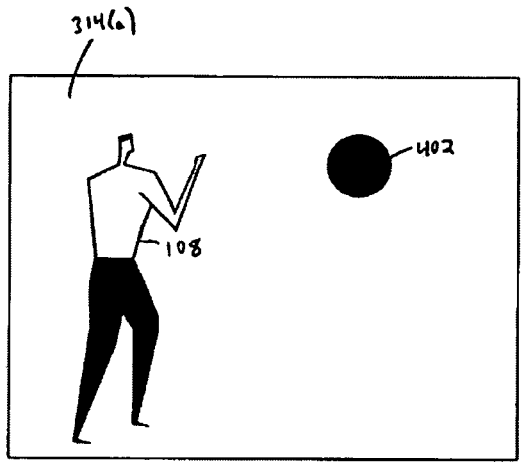
FIG. 5A illustrates a first captured image.
Figure 5B:
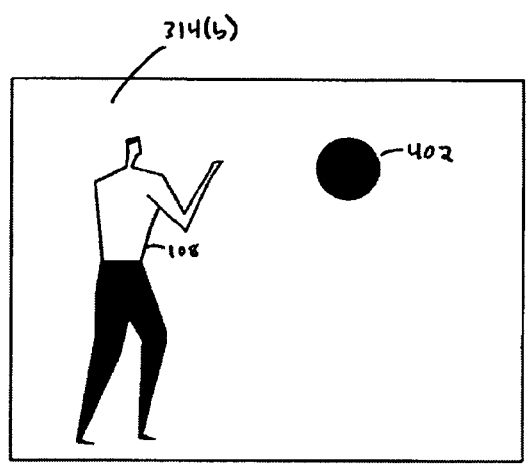
FIG. 5B illustrates a second captured image.
Figure 5C:
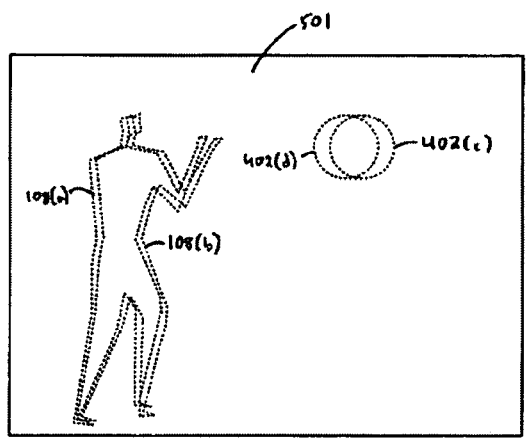
FIG. 5C illustrates a composite image of the first and second captured images of FIGS. 5A-5B.

As a brief introduction to FIGS. 5A-5E, FIGS. 5A-5B show a sequence of captured images. FIG. 5C shows a composite image of the sequence of captured images shown in FIGS. 5A-5B, and FIGS. 5D-5E show captured image motion maps identifying motion in the sequence of captured images shown in FIGS. 5A-5B.

Figure 4D:
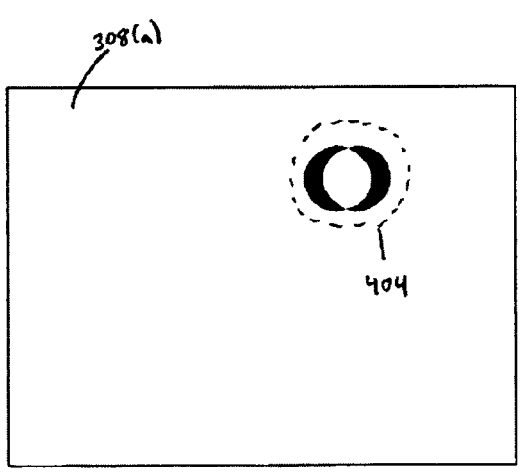
FIG. 4D illustrates a first display image motion map corresponding to the first and second display images of FIGS. 4A-4B.
Figure 4E:
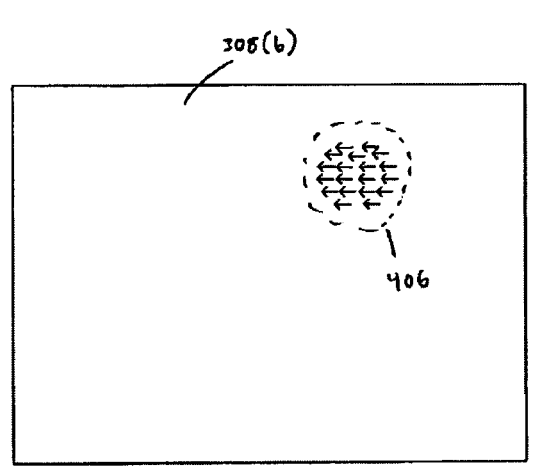
FIG. 4E illustrates a second display image motion map corresponding to first and second display images of FIGS. 4A-4B.
Figure 5D:
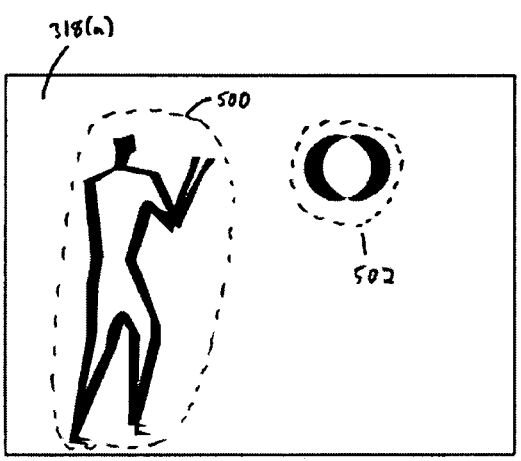
FIG. 5D illustrates a first captured image motion map corresponding to the first and second captured images of FIGS. 5A-5B.
Figure 5E:
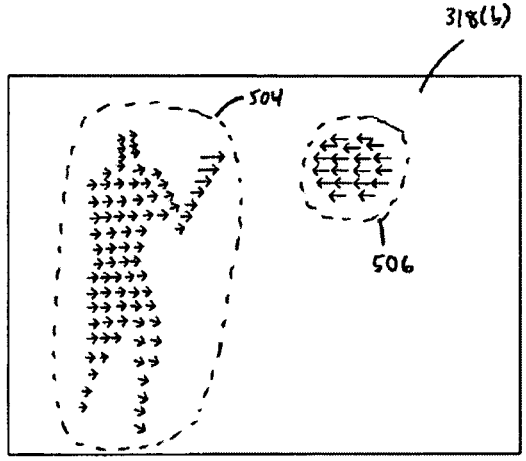
FIG. 5E illustrates a second captured image motion map corresponding to the captured images of FIGS. 5A-5B.
Figure 6A:
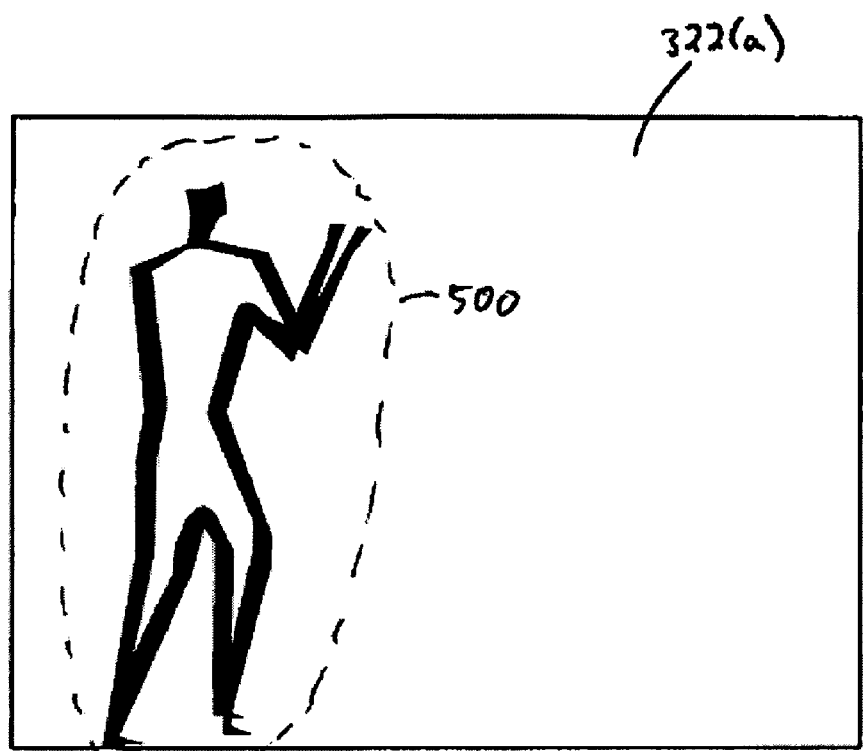
FIG. 6A illustrates a first user motion map.
Figure 6B:
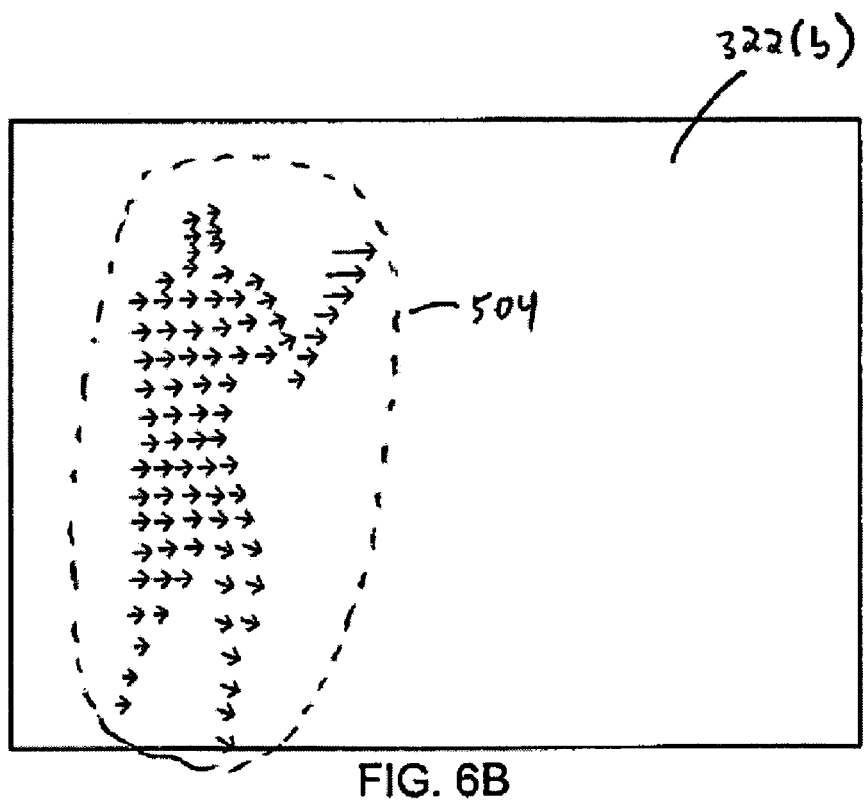
FIG. 6B illustrates a second user motion map.

As a brief introduction to FIGS. 6A-6B, FIGS. 6A-6B show user motion maps corresponding to the display image motion maps of FIGS. 4D-4E and the captured image motion maps of FIGS. 5D-5E.

FIG. 4A shows a first display image 304(*a*) and FIG. 5A shows a corresponding first captured image 314(*a*) including the first display image 304(*a*) and the user 108 interacting with the display. The application 302 generates the first display image 304(*a*) at time t−1 and provides the first display image 304(*a*) to the display image motion detection module 306 and the display device 310. As depicted in FIG. 4A, the first display image 304(*a*) includes a ball 402. The display device 310 displays the first display image 304(*a*) on the display screen 104 and the user 108 interacts with the display. The camera 110 captures the first captured image 314(*a*) including the first display image 304(*a*) and the user 108 interacting with the display. Therefore, the first captured image 314(*a*) includes both the user 108 and the ball 402 of the first display image 304(*a*).

FIG. 4B shows a second display image 304(*b*) and FIG. 5*b* shows a corresponding second captured image 314(*b*) including the second display image 304(*b*) and the user 108 interacting with the display. The application 302 generates a second display image 304(*b*) at time t and provides the second display image 304(*b*) to the display image motion detection module 306 and the display device 310. As depicted in FIG. 4B, the second display image 304(*b*) includes the same ball 402 as the first display image 304(*a*). However, the position of the ball 402 in the second display image 304(*b*) is further to the left relative to the position of the ball 402 in the first display image 304(*a*). FIG. 4C shows a composite image 403 of the first display image 304(*a*) and the second display image 304(*b*) in order to illustrate the different positions of the ball 402 in the first display image 304(*a*) and the second display image 304(*b*). The composite image 403 presented in FIG. 4C is not generated by the architecture 300 or any components of the architecture 300. Rather, it is presented for the purposes of illustration in order to show the different position of the ball 402 in the first display image 304(*a*) and the second display image 304(*b*). Dashed circle 402(*a*) represents the position of the ball 402 in the first display image 304(*a*) and dashed circle 402(*b*) represents the position of the ball 402 in the second display image 304(*b*).

The display device 310 displays the second display image 304(*b*) on the display screen 104 and the user 108 interacts with the display. The camera 110 captures the second captured image 314(*b*) including the second display image 304(*b*) and the user 108 interacting with the display. Therefore, the second captured image 314(*b*) includes both the user 108 and the ball 402 of the second display image 304(*b*). As depicted in FIG. 5B, the user 108 is further to the right in the second captured image 314(*b*) relative to the position of the user 108 in the first captured image 314(*a*), and the position of the ball 402 is further to the left in the second captured image 314(*b*) relative to the position of the ball 402 in the first captured image 314(*a*). FIG. 5C shows a composite image 501 of the first captured image 314(*a*) and the second captured image 314(*b*) in order to illustrate the different positions of the user 108 and the ball 402 in the first captured image 314(*a*) and the second captured image 314(*b*). The composite image 501 presented in FIG. 5C is not generated by the architecture 300 or any components of the architecture 300. Rather, it is presented for the purposes of illustration to show the different position of the user 108 and the ball 402 in the first captured image 314(*a*) and the second captured image 314(*b*). Dashed outline of the user 108(*a*) represents the position of the user 108 in the first captured image 314(*a*) and dashed outline of the user 108(*b*) represents the position of the user 108 in the second captured image 314(*b*). Dashed circle 402(*c*) represents the position of the ball 402 in the first captured image 314(*a*) and dashed circle 402(*d*) represents the position of the ball 402 in the second captured image 314(*b*).

The differences between the second display image 304(*b*) and the first display image 304(*a*) create the appearance of animation (i.e., motion) in the display. The difference between the position of the ball 402 in the first display image 304(*a*) and the position of the ball 402 in the second display image 304(*b*) represents the motion of the ball between time t−1 and time t. More generally, the difference between the first display image 304(*a*) and the second display image 304(*b*) represents the motion in the display between time t−1 and time t.

The first display image 304(*a*) and the second display image 304(*b*) are provided to the display image motion detection module 306 to determine the motion in the display images 304(*a*) and 304(*b*). The display image motion detection module 306 compares the first display image 304(*a*) with the second display image 304(*b*) and creates a display image motion map 308 identifying motion within the two images 304(*a*) and 304(*b*). FIG. 4D illustrates an example of a display image motion map 308(*a*) generated by performing an absolute difference operation on the first display image 304(a) and the second display image 304(b). As seen in FIG. 4D, the display image motion map 308(a) generated by performing an absolute difference operation on the first display image 304(a) and the second display image 304(b) identifies the presence of motion 404 within regions of the display images 304(a) and 304(b).

FIG. 4E illustrates an example of a display image motion map 308(b) generated by performing an optical flow operation on the first display image 304(a) and the second display image 304(b). As seen in FIG. 4E, the display image motion map 308(b) generated by performing an optical flow operation on the first display image 304(a) and the second display image 304(b) uses vectors 406 to identify the presence, direction, and magnitude of motion within the display images 304(a) and 304(b).

As discussed above, the position of the user 108 in the second captured image 314(b) is further to the right relative to the position of the user 108 in the first captured image 314(a). The difference in the user's 108 position may be attributable to the user's interaction with the display. For example, the user 108 may be moving closer to the ball 402 in order to strike the ball 402 as if playing a simulated (e.g., virtual) game of volleyball. The difference between the position of the user 108 in the first captured image 314(a) and the position of the user 108 in the second captured image 314(b) represents the user's 108 motion between time t−1 and time t.

The first captured image 314(a) and the second captured image 314(b) are provided to the captured image detection module 316. The captured image motion detection module 316 compares the first captured image 314(a) with the second captured image 314(b) and creates a captured image motion map 318 identifying motion within the two images 314(a) and 314(b). FIG. 5D illustrates an example of a captured image motion map 318(a) generated by performing an absolute difference operation on the first captured image 314(a) and the second captured image 314(b). As seen in FIG. 5D, the captured image motion map 318(a) identifies motion attributable to the user 500 as well as motion in the display 502. FIG. 5E illustrates an example of a display image motion map 318(b) generated by performing an optical flow operation on the first captured image 314(a) and the second captured image 314(b). As seen in FIG. 5E, the captured image motion map 318(b) uses vectors to identify motion attributable to the user 504 and motion in the display 506. The optical flow algorithm used to generate the captured image motion map 318(b) may recognize common objects in the first captured image 314(a) and the second captured image 314(b) (e.g., the user 108 and the ball 402) and compare the positions of the common objects in the first captured image 314(a) and the second captured image 314(b) in order to generate the vectors identifying motion in the images 314(a) and 314(b).

The comparison module 320 generates user motion maps 322 by comparing display image motion maps 308 to captured image motion maps 318. FIG. 6A illustrates an example of a user motion map 322(a) corresponding to display image motion map 308(a) and captured image motion map 318(a). As seen in FIG. 6A, the user motion map 322(a) identifies motion attributable only (or predominately) to the user 500. FIG. 6B illustrates an example of a user motion map 322(b) corresponding to display motion map 308(b) and captured image motion map 318(b). As seen in FIG. 6B, the user motion map 322(b) identifies motion attributable only (or predominately) to the user 504.

Figure 7:
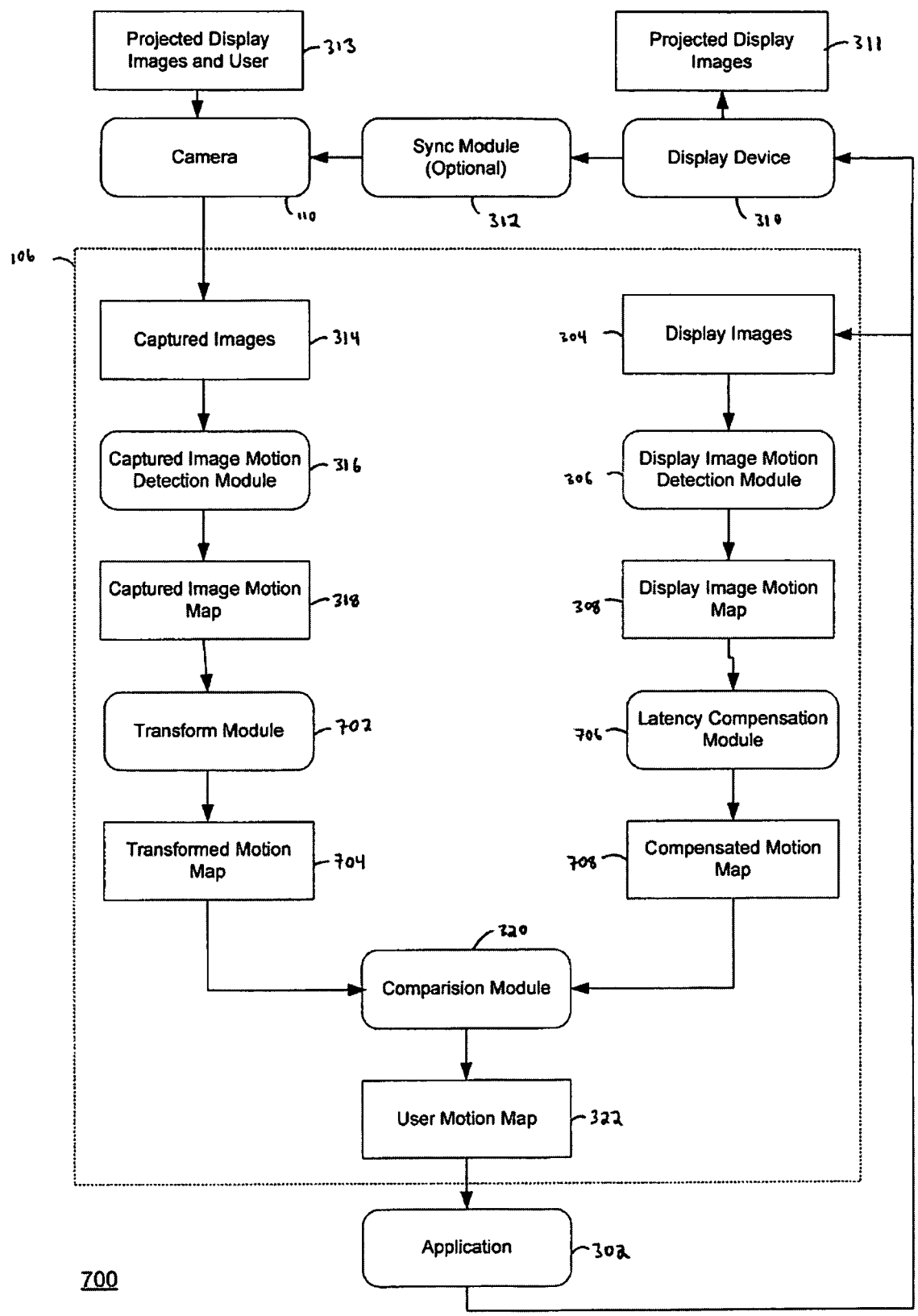
FIG. 7 is a block diagram of another architecture of an interactive system.

Referring to FIG. 7, an architecture 700 of a system is shown. Except for the differences noted below, the architecture 700 is substantially the same as the architecture 300 described in connection with FIG. 3.

In some implementations, there may be a discrepancy between the position of features in the captured image motion map 318 and the position of corresponding features in the display image motion map 308, because, for example, the camera 110 is rotated vis-à-vis the display screen 104, the projector 102 and the camera 110 are off-axis from one another (e.g., as depicted in FIG. 1A, the camera 110 is above the projector 102 and therefore the projector 102 and the camera 110 do not share the same axis), or because the resolution of the captured images 314 used to generate the captured image motion map 318 is different than the resolution of the display images 304 used to generate the display image motion map 308. Therefore, in some implementations, the computing device 106 includes a geometric transform module 702 for transforming (e.g., warping, rotating, scaling, shifting) the data in the captured image motion map 318 into a transformed captured image motion map 704 such that features in the transformed captured image motion map 704 are aligned with corresponding features in the display image motion map 308. Thus, the geometric transform operation can compensate for a camera 110 that is installed upside-down, for a camera 110 that is installed off-axis from the projector 102, or for a display image that is projected onto a mirror 116 that reflects the display image onto the display screen 104. The geometric transform operation may include, for example, moving or rearranging pixels, scaling the dimensions of the captured image motion map 318, interpolating motion values, and/or extrapolating motion values.

A calibration process can be used to determine a geometric mapping between coordinates of a display image and a captured image including the display image. The geometric mapping then can be used to determine the geometric transform operation required to align features in the captured image motion map 318 with corresponding features in the display image motion map 308.

The calibration process may include displaying a known pattern, for example, a grid of dots or a checkerboard, on the display screen 104. The camera 110 captures an image including the pattern and the position of the pattern within the captured image is calculated. The position of the elements of the pattern within the captured image relative to the position of the corresponding elements within the display image then can be used to define a geometric mapping between the coordinates of the captured image and the display image for every pixel in the captured image.

Additionally or alternatively, the calibration process may include displaying a blank image for a short period of time before displaying the pattern, or a portion of the pattern. The captured image motion detection module 316 can detect the pattern by detecting the changes (e.g., motion) in the captured images.

As described above, the geometric transform module 702 performs a geometric transform operation on the captured image motion map 318. However, in an alternative implementation, the geometric transform module 702 performs the geometric transform operation on the captured images 314 before the captured images 314 are provided to the captured image motion detection module 316.

The process of transmitting display images 304 from the application 302 to the display device 310, displaying the display images, capturing images with the camera 110, and processing the captured images 314 typically results in a latency (i.e., delay). As a result, an image captured by the camera at time t includes a display image generated a short time earlier. Therefore, in some implementations, the computing device 106 includes a latency compensation module 706 that performs a latency compensation operation to ensure that the comparison module 320 compares latency compensated display image motion maps 708 and transformed captured image motion maps 704 that correspond to each other in time.

In some implementations, the latency compensation module 706 stores a display image motion map 308 in a buffer for a period of time equal to the duration of latency before providing the latency compensated display image motion map 708 to the comparison module 320. As a result, the latency compensated display image motion map 708 arrives at the comparison module 320 at approximately the same time as the corresponding transformed captured image motion map 704. In alternative implementations, the latency compensation module 706 stores a display image 304 in a buffer for a period of time equal to the duration of latency before providing the display image 304 to the display image motion detection module 306.

Additionally or alternatively, the latency compensation module 706 can be used to compensate for discrepancies between the frame rate of the display device 310 and the sampling rate of the camera 110. For example, the frame rate of the display device 310 may be greater than the sampling rate (e.g., exposure time) of the camera 110. A single captured image 314, therefore, may include exposures of multiple display images 304. In order to compensate for such a discrepancy between the frame rate of the display device 310 and the sampling rate of the camera 110, the latency compensation module 706 may combine multiple consecutive display image motion maps 308 into a single, latency compensated display image motion map 708. The number of display motion maps 308 combined to produce a single, latency compensated display image motion map 708 is selected to match the number of display images displayed during one camera 110 sampling period (e.g., exposure).

Display image motion maps 308 that are generated using the absolute difference operation may be combined using a logical "OR" operation. In other words, a pixel in the latency compensated display image motion map 708 will be defined as representing motion if a corresponding pixel in any of the multiple display image motion maps 308 combined to generate the latency compensated display image motion map 708 is defined as representing motion.

Alternatively, display image motion maps 308 that are generated using an optical flow operation may be combined by assigning each pixel in the latency compensated display image motion map 708 a range of motion such that the range of motion for the pixel includes the motion of the corresponding pixels in the multiple display image motion maps 308 combined to generate the latency compensated display image motion map 708.

A calibration process can be used to determine the latency between the time that a display image is transmitted to the display device 310 and the time a corresponding image is captured by the camera 110. The calibration process may include displaying a blank display image for a period of time and then displaying a display image including a pattern. The time that the display image including the pattern is transmitted to the display device 310 is recorded and compared to the time that the pattern is detected in a corresponding captured image to determine the latency.

In some implementations, the application 302 provides display image motion maps 308 directly to the computing device 106. In such implementations, the display image motion detection module 306 is not required. Furthermore, while FIGS. 3 and 7 depict the application 302 as external to the computing device 106, in some implementations, the application 302 resides within and runs on the computing device 106. As these implementations make clear, the functionality described herein may be executed in different modules and devices. Accordingly, the interfaces between devices may change as functionality is shifted from one device to another.

In some implementations, after a user motion map 322 has been generated, the user motion map 322 is provided as input to the application 302 that generates the display images 304. The application 302 uses the user motion map 322 to detect user 108 interaction.

For example, the application 322 may determine that the user 108 is "touching" an object in the display images 304 if user 108 motion is detected in a region corresponding to the known location of the object for one or more consecutive frames. For instance, the user 108 may be able to select a button (e.g., turn a button "on" or "off") by "touching" the button. It should be understood that the user 108 need not physically touch the display surface 104 in order for the application 302 to determine that the user 108 is "touching" an object in the display images 304. While the user 108 may physically touch the display screen 104, the application 302 may also determine that the user 108 is "touching" an object in the display images 304 when a portion of the user's 108 body waves or hovers above or near the object displayed on the display screen 104.

In addition, the application 302 can determine the amount of user 108 motion in a region corresponding to an object in the display images 304 by determining the portion of the region's area that is classified as containing user 108 motion. Consequently, the application 302 can distinguish different types of user 108 motion (e.g., subtle motions versus deliberate motions) and use different types of user 108 motion to control the location and/or behavior of an object. As should also be clear, implementations may ignore user motion that does not occur near a region of interest in a display image.

Alternatively, when the application 302 receives optical flow user motion maps 322, the application 302 can determine the amount of motion in a region based upon the average or maximum magnitude of the motion vectors within the region. The application 322, therefore, can use the velocity of the user's 108 motion to control the location and/or behavior of an object. For example, if an object has an initial velocity before being touched by the user 108, the application 302 may alter the velocity of the object after being touched by the user 108 such that the object's resulting velocity reflects a combination of the object's initial velocity and the velocity imparted to the object by the user 108.

The application 302 also may allow the user 108 to use motion to transform the appearance of an object in the display images 304. For example, the application may allow the user to "wipe" the display screen 104 to reveal a new object in place of the original object.

Implementations may determine user motion in various other ways. For example, the display images 304 may be "subtracted" from the captured images 314 prior to determining motion. Similarly, other implementations may rearrange the order in which the described functionality is performed.

The computing device 106 may be a computer or another type of processing device. For example, the computing device 106 may be a personal computer (PC) running a Microsoft Windows operating system. Additionally or alternatively, the computing device 106 may include a video graphics card having a digital signal processing (DSP) chip and/or programmable pixel-shaders. Furthermore, the computing device 106 may be an individual component or the computing device 106 may be incorporated into the display device 310. Incorporating the computing device 106 into the display device 310 may reduce the delay that is typically inherent in the process of transmitting, displaying, capturing, and processing display images.

If the application 302 resides on computing device 106, the application may utilize Macromedia Flash in the form of an ActiveX object. Computing device 106 may associate a Windows Device Context with a display image buffer and computing device 106 may provide the Device Context to the Macromedia Flash ActiveX object, such that Macromedia Flash renders images into the display image buffer.

Alternatively, the application 302 may be external to the computing device 106. When the application 302 is external to the computing device 106, a video signal (e.g., a video graphics array (VGA) signal) may be transmitted to both the display device 310 and a video capture device (e.g., a VGA frame grabber). The video capture device may generate representations of the display images and store the representations of the display images in a display image buffer.

Implementations may include one or more devices configured to perform one or more processes. A device may include, for example, discrete or integrated hardware, firmware, and software. A device may include, for example, a processor, which refers to processing devices in general, including, for example, a microprocessor, an integrated circuit, or a programmable logic device.

A device also may include one or more computer readable media having instructions for carrying out one or more processes. The computer readable medium may include, for example, a storage device such as, for example, a hard disk, a compact diskette, a random access memory ("RAM"), and a read-only memory ("ROM"). A computer readable medium also may include, for example, formatted electromagnetic waves encoding or transmitting instructions. Instructions may be, for example, in hardware, firmware, software, and in an electromagnetic wave. Instructions may be found in, for example, an operating system, a separate application, or a combination of the two. A processor may be characterized, therefore, as, for example, both a device configured to carry out a process and a device including computer readable media having instructions for carrying out a process.

A number of implementations have been described. Nevertheless, it will be understood that various modifications may be made. For example, elements of different implementations may be combined, supplemented, modified, or removed to produce other implementations. Accordingly, other implementations are within the scope of the following claims.

What is claimed is:

1. A computer-implemented method comprising:
accessing a first captured image that includes (1) one or more projected objects in a first display produced at a first point in time by a set of instructions executed by a computing device, and (2) a user interacting with the first display and not part of the first display;
accessing a second captured image that includes (1) one or more of the projected objects in a second display produced at a second point in time by the set of instructions executed by the computing device, and (2) the user interacting with the second display and not part of the second display;
determining a display image motion map based on the first display and the second display, the display image motion map describing motion of the one or more projected objects;
determining a captured image motion map based on the first captured image and the second captured image, the captured image motion map describing motion of both the user and the one or more projected objects;
comparing the display image motion map and the captured image motion map to segment motion of the user from motion of the one or more projected objects;
determining motion of the user based on a result of the comparing of the display image motion map and the captured image motion map; and
relating the determined motion of the user to a portion of one or more of the first and second captured images.

2. The method of claim 1 further comprising providing an indication of the determined motion of the user and the portion to the computing device.

3. The method of claim 1 further comprising determining an input for the set of instructions based on the determined motion and the portion.

4. The method of claim 1 wherein comparing the display image motion map and the captured image motion map comprises performing an absolute difference operation on the display image motion map and the captured image motion map.

5. The method of claim 1 wherein comparing the display image motion map and the captured image motion map comprises performing an optical flow operation on the display image motion map and the captured image motion map.

6. The method of claim 1 wherein comparing the display image motion map and the captured image motion map comprises producing the result, and the result is an image indicating motion of the user and motion associated with one or more of the projected objects in the first and second displays.

7. The method of claim 6 further comprising performing a geometric transform operation on the result.

8. The method of claim 6 wherein determining motion of the user, based on the result of the comparing of the display image motion map and the captured image motion map comprises isolating, in the result, the motion of the user from the motion associated with one or more of the projected objects in the first and second displays.

9. A system comprising:
a captured image motion detection module configured to:
access a first captured image that includes (1) one or more projected objects in a first display produced at a first point in time by a set of instructions executed by a computing device, and (2) a user interacting with the first display and not part of the first display;
access a second captured image that includes (1) one or more of the projected objects in a second display produced at a second point in time by the set of instructions executed by the computing device, and (2) the user interacting with the second display and not part of the second display; and
determine a captured image motion map based on the first captured image and the second captured image, the captured image motion map describing motion of both the user and the one or more projected objects;
a display image motion detection module configured to determine a display image motion map based on the first display and the second display, the display image motion map describing motion of the one or more projected objects; and
a comparison module configured to:
compare the display image motion map and the captured image motion map to segment motion of the user from motion of the one or more projected objects;

determine motion of the user based on a result of the comparing of the display image motion map and the captured image motion map; and relate the determined motion of the user to a portion of one or more of the first and second captured images.

10. The system of claim 9 further comprising:

a camera configured (1) to capture the first captured image and provide the first captured image to the captured image motion detection module, and (2) to capture the second captured image and provide the second captured image to the captured image motion detection module;

a display to display images; and a computing device configured to execute a set of instructions to produce the first and second displays.

11. The system of claim 9 further comprising a latency compensation module configured to perform a latency compensation operation on the display image motion map.

12. The system of claim 9 further comprising a geometric transform module configured to perform a geometric transform operation on the captured image motion map.

13. An apparatus comprising a non-transitory computer-readable medium including instructions that when executed by a processing device result in at least the following:

accessing a first captured image that includes (1) one or more projected objects in a first display produced at a first point in time by a set of instructions executed by a computing device, and (2) a user interacting with the first display and not part of the first display;

accessing a second captured image that includes (1) one or more of the projected objects in a second display produced at a second point in time by the set of instructions executed by the computing device, and (2) the user interacting with the second display and not part of the second display;

determining a display image motion map based on the first display and the second display, the display image motion map describing motion of the one or more projected objects;

determining a captured image motion map based on the first captured image and the second captured image, the captured image motion map describing motion of both the user and the one or more projected objects;

comparing the display image motion map and the captured image motion map to segment motion of the user from motion of the one or more projected objects;

determining motion of the user based on a result of the comparing of the display image motion map and the captured image motion map; and relating the determined motion of the user to a portion of one or more of the first and second captured images.

14. A computer-implemented method comprising:

accessing display images that are generated by an application for display on a display screen and that include one or more objects moving in the display images;

determining a display image motion map based on the display images, the display image motion map describing motion of the one or more objects within the display images;

accessing captured images of a user interacting with the display images when displayed on the display screen;

determining a captured image motion map based on the captured images, the captured image motion map describing motion of both the user and the one or more objects within the captured images;

comparing the display image motion map and the captured image motion map to segment motion of the user within the captured images from motion of the one or more objects within the captured images;

determining a user motion map based on the comparison of the display image motion map and the captured image motion map, the user motion map describing motion of the user within the captured images; and using the user motion map to control the application.

15. The method of claim 14:

wherein the one or more objects comprise one or more projected objects, wherein accessing display images that are generated by the application for display on the display screen and that include one or more objects moving in the display images comprises accessing display images that are generated by a application for display on a display screen and that include the one or more projected objects moving in the display images;

wherein determining the display image motion map based on the display images comprises determining a display image motion map based on the display images, the display image motion map describing motion of the one or more projected objects within the display images;

wherein determining the captured image motion map based on the captured images comprises determining a captured image motion map based on the captured images, the captured image motion map describing motion of both the user and the one or more projected objects within the captured images; and wherein comparing the display image motion map and the captured image motion map to segment motion of the user within the captured images from motion of the one or more objects within the captured images comprises comparing the display image motion map and the captured image motion map to segment motion of the user within the captured images from motion of the one or more objects within the captured images.

16. The method of claim 14, further comprising performing a latency compensation operation on the display image motion map.

17. The method of claim 14, further comprising performing a geometric transform operation on the captured image motion map.

18. The method of claim 14, further comprising:

performing a latency compensation operation on the display image motion map to produce a compensated motion map; and performing a geometric transform operation on the captured image motion map to produce a transformed motion map, wherein comparing the display image motion map and the captured image motion map to segment motion of the user within the captured images from motion of the one or more objects within the captured images comprises comparing the compensated motion map and the transformed motion map to segment motion of the user within the captured images from motion of the one or more objects within the captured images.

19. The method of claim 14 wherein determining the user motion map based on the comparison of the display image motion map and the captured image motion map comprises isolating motion of the user from motion associated with the one or more objects within the captured images such that the user motion map only describes motion of the user within the captured images without describing motion of any of the one or more objects within the captured images.

20. An apparatus comprising a non-transitory computer-readable medium including instructions that when executed by a processing device result in at least the following:
- accessing display images that are generated by an application for display on a display screen and that include one or more objects moving in the display images;
- determining a display image motion map based on the display images, the display image motion map describing motion of the one or more objects within the display images;
- accessing captured images of a user interacting with the display images when displayed on the display screen;
- determining a captured image motion map based on the captured images, the captured image motion map describing motion of both the user and the one or more objects within the captured images;
- comparing the display image motion map and the captured image motion map to segment motion of the user within the captured images from motion of the one or more objects within the captured images;
- determining a user motion map based on the comparison of the display image motion map and the captured image motion map, the user motion map describing motion of the user within the captured images; and
- using the user motion map to control the application.

* * * * *